United States Patent
Gupta (10) Patent No.: US 11,742,750 B2
(45) Date of Patent: Aug. 29, 2023

(54) BOOST CONVERTER APPARATUS AND CONTROL METHOD

(71) Applicant: Halo Microelectronics International, Campbell, CA (US)

(72) Inventor: Milind Chandra Gupta, San Jose, CA (US)

(73) Assignee: Halo Microelectronics International, Campbell, CA (US)

( * ) Notice: Subject to any disclaimer, the term of this patent is extended or adjusted under 35 U.S.C. 154(b) by 185 days.

(21) Appl. No.: 17/498,590

(22) Filed: Oct. 11, 2021

(65) Prior Publication Data

US 2023/0116031 A1    Apr. 13, 2023

(51) Int. Cl.
*H02M 1/42* (2007.01)
*H02M 1/00* (2006.01)
*H02M 3/155* (2006.01)

(52) U.S. Cl.
CPC ....... *H02M 1/4225* (2013.01); *H02M 1/0003* (2021.05); *H02M 3/155* (2013.01)

(58) Field of Classification Search
CPC ... H02M 1/4225; H02M 1/0003; H02M 3/155
See application file for complete search history.

(56) References Cited

U.S. PATENT DOCUMENTS

| | | | |
|---|---|---|---|
| 9,455,623 B2 * | 9/2016 | Fan | H02M 1/4225 |
| 10,128,744 B1 | 11/2018 | Viswanathan et al. | |
| 10,211,737 B1 * | 2/2019 | Costa | H02M 1/4225 |
| 10,734,887 B1 * | 8/2020 | Halberstadt | H02M 7/217 |
| 2007/0035975 A1 | 2/2007 | Dickerson et al. | |
| 2013/0242629 A1 | 9/2013 | Kesterson et al. | |
| 2015/0002109 A1 | 1/2015 | Bianco | |
| 2015/0124494 A1 | 5/2015 | Malinin | |
| 2015/0214825 A1 | 7/2015 | Wahby | |
| 2016/0020692 A1 * | 1/2016 | Castelli | H02M 1/4208 323/205 |
| 2016/0065080 A1 | 3/2016 | Pastrana et al. | |
| 2016/0336870 A1 * | 11/2016 | Halim | H02M 1/4225 |
| 2017/0317586 A1 | 11/2017 | Musa et al. | |
| 2020/0083794 A1 | 3/2020 | Bhandarkar et al. | |

(Continued)

FOREIGN PATENT DOCUMENTS

| | | |
|---|---|---|
| CN | 101034851 A | 9/2007 |
| CN | 102044972 A | 5/2011 |
| CN | 103312198 A | 9/2013 |

(Continued)

OTHER PUBLICATIONS

On Semiconductor, "Compact Fixed Frequency Discontinuous or Critical Conduction Voltage Mode Power Factor Correction Controller" Semiconductor Components Industries, LLC, Dec. 2010, 20 pages.

*Primary Examiner* — Jue Zhang
(74) *Attorney, Agent, or Firm* — AP3 Law Firm PLLC (57) ABSTRACT

A method includes comparing a ramp signal with an output signal of an error amplifier to determine an initial turn-on time of a boost converter, generating a turn-on time of the boost converter through multiplying the initial turn-on time by a predetermined constant greater than or equal to 1, and maintaining a switching frequency of the boost converter substantially constant through varying a value of the predetermined constant.

20 Claims, 7 Drawing Sheets

(56) References Cited

U.S. PATENT DOCUMENTS

2021/0367507 A1* 11/2021 Deng .................. H02M 1/0025

FOREIGN PATENT DOCUMENTS

| | | |
|---|---|---|
| CN | 103326546 A | 9/2013 |
| CN | 103368538 A | 10/2013 |
| CN | 104201887 A | 12/2014 |
| CN | 106300972 A | 1/2017 |
| CN | 206180848 U | 5/2017 |
| CN | 107196491 A | 9/2017 |
| CN | 107370373 A | 11/2017 |
| CN | 207399028 U | 5/2018 |
| CN | 108429460 A | 8/2018 |
| CN | 108667302 A | 10/2018 |
| CN | 110932576 A | 3/2020 |
| CN | 111182676 A | 5/2020 |
| CN | 111934557 A | 11/2020 |
| CN | 112671230 A | 4/2021 |
| CN | 213717839 U | 7/2021 |
| CN | 113572242 A | 10/2021 |
| CN | 113702688 A | 11/2021 |
| JP | 2010206990 A | 9/2010 |

* cited by examiner

BOOST CONVERTER APPARATUS AND CONTROL METHOD

TECHNICAL FIELD

The present invention relates to a power factor correction boost converter, and, in particular embodiments, to a control method and apparatus for configuring the power factor correction boost converter to operate in a discontinuous conduction mode.

BACKGROUND

As technologies further advance, a variety of computing devices such as laptops, mobile phones, tablet PCs, digital cameras, MP3 players and/or the like, have become popular. A computing device receives power from a power source. The power source may be a power conversion system converting power from an alternating current (ac) power supply to a regulated direct current (dc) voltage.

The power conversion system may include an electromagnetic interference filter (EMI) filter, a rectifier and a power factor correction boost converter connected in cascade between the ac power supply and an output port coupled to the computing device. The EMI filter of the power conversion system is used to suppress conducted EMI noise from the ac power supply. The rectifier is connected directly to the output terminals of the EMI filter. The rectifier is able to convert the input ac waveform to a pulsating dc waveform at the output terminals of the rectifier. A plurality of capacitors may be coupled between the two output terminals of the rectifier. The capacitors are used to attenuate the ripple of the pulsating dc waveform.

The power factor correction boost converter comprises an inductor, a transistor switch and a diode. A first output terminal of the rectifier is coupled to a first terminal of the inductor. A second terminal of the inductor is coupled to a drain of the transistor switch and an anode of the diode. A cathode of the diode is coupled to a first terminal of the output port of the power conversion system. A second output terminal of the rectifier is coupled to a source of the transistor switch and a second terminal of the output port of the power conversion system, and further coupled to a ground node. A controller is employed to generate a gate drive signal applied to the gate of the transistor switch. The gate drive signal determines whether the transistor switch is conductive (the switch is closed) or non-conductive (the switch is open).

In operation, when the transistor switch is conductive (the switch is closed), a current flows in a conductive path including the inductor and the transistor switch. After the transistor switch has been closed, the diode is reverse-biased by the output voltage. The current flowing through the inductor stores energy in the inductor. When the transistor switch is non-conductive (the switch is open), the energy stored in the inductor is transferred to the output by a current flowing through the diode.

In order to achieve a high power factor, the boost converter is controlled such that the current drawn from the ac power supply by the boost converter is substantially in phase with the ac voltage provided by the ac power supply. Furthermore, the duty cycle of the transistor switch is controlled such that the output voltage of the power conversion system is regulated at a predetermined level.

The boost converter may operate in a discontinuous conduction mode. Alternatively, the boost converter may operate in a critical conduction mode. In the discontinuous conduction mode, the switching control scheme of a conventional boost converter is not simple to implement because it requires a complex timing control scheme. In the critical conduction mode, there is no dead time and the next switching cycle is started as soon as the inductor current returns to zero. This approach, however, causes the switching frequency of the boost converter to vary significantly in one line cycle. Furthermore, the switching frequency of the boost converter may vary in response to load changes. It would be desirable to have a simple control scheme for configuring the boost converter to operate in the discontinuous conduction mode to achieve a high power factor. The present disclosure addresses this need.

SUMMARY

These and other problems are generally solved or circumvented, and technical advantages are generally achieved, by preferred embodiments of the present disclosure which provide a control method and apparatus for configuring the power factor correction boost converter to operate in a discontinuous conduction mode.

In accordance with an embodiment, a method comprises comparing a ramp signal with an output signal of an error amplifier to determine an initial turn-on time of a boost converter, generating a turn-on time of the boost converter through multiplying the initial turn-on time by a predetermined constant greater than or equal to 1, and maintaining a switching frequency of the boost converter substantially constant through varying a value of the predetermined constant.

In accordance with another embodiment, a controller comprises a duty cycle generator configured to generate an initial turn-on time of a boost converter based on a comparison between an error amplifier output signal and a ramp, and a turn-on time generator configured to generate a turn-on time of the boost converter through multiplying the initial turn-on time by a predetermined constant greater than or equal to 1.

In accordance with yet another embodiment, a system comprises a boost converter comprising an inductor and a switch connected in series between an input port and ground and a freewheeling device connected between a common node of the inductor and the switch, and an output port, and a controller configured to generate a gate drive signal fed into a gate of the switch, wherein the controller comprises a duty cycle generator configured to generate an initial turn-on time of the switch based on a comparison between an error amplifier output signal and a ramp, and a turn-on time generator configured to generate an turn-on time of the switch through multiplying the initial turn-on time by a predetermined constant greater than or equal to 1.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a control method and apparatus for configuring a power factor correction boost converter to operate in a discontinuous conduction mode. The invention may also be applied, however, to a variety of power converters. Hereinafter, various embodiments will be explained in detail with reference to the accompanying drawings.

Figure 1:
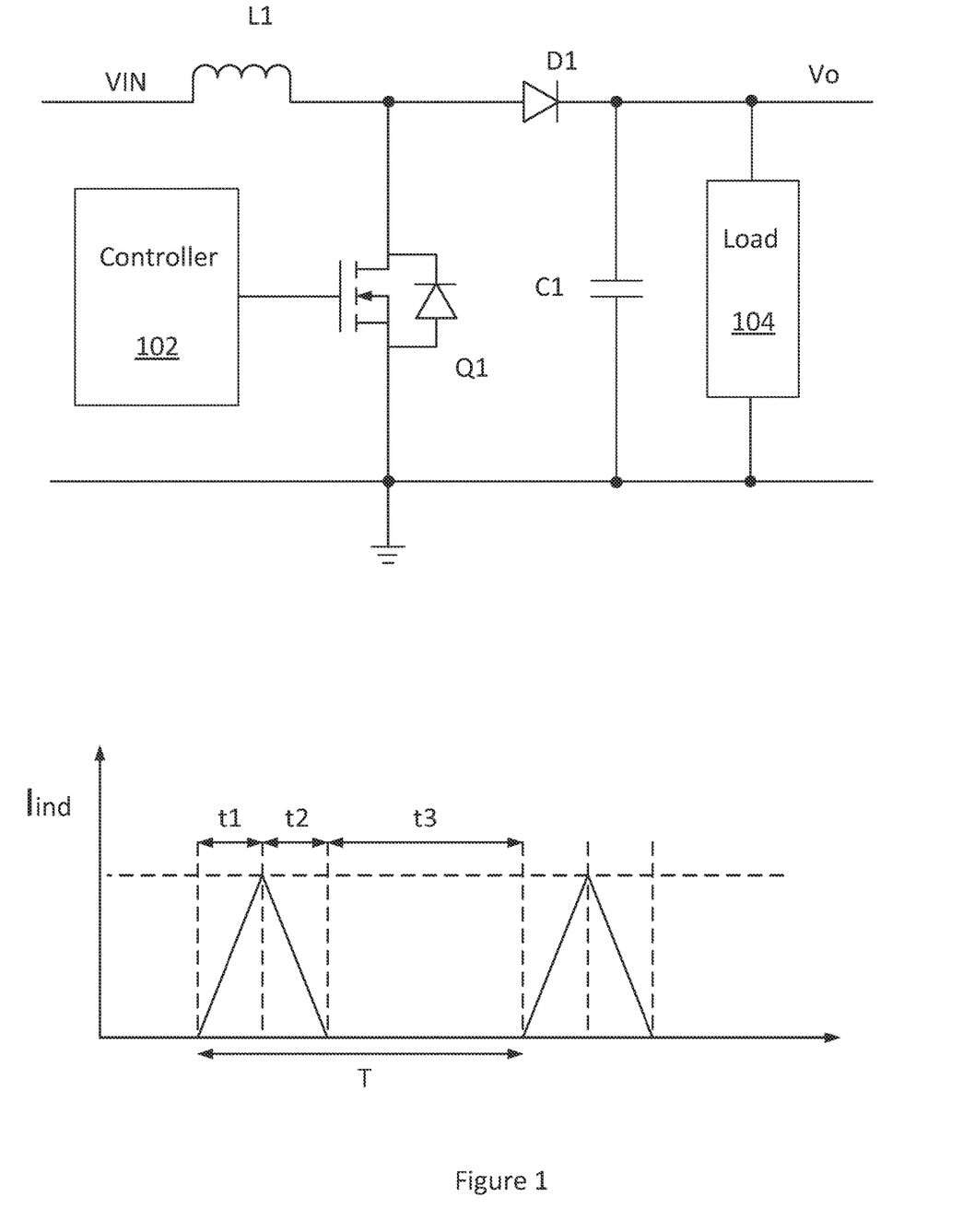
FIG. 1 illustrates a schematic diagram of a boost converter and the associated inductor current waveform in accordance with various embodiments of the present disclosure.

FIG. 1 illustrates a schematic diagram of a boost converter and the associated inductor current waveform in accordance with various embodiments of the present disclosure. The boost converter is configured as a power factor correction apparatus. The inputs of the boost converter are coupled to an ac power supply through a rectifier. The outputs of the boost converter are coupled to a load 104.

The boost converter comprises an inductor L1 and a switch Q1 connected in series between an input voltage bus VIN and ground. The boost converter further comprises a diode D1 connected between a common node of L1 and Q1, and an output voltage bus Vo. An output capacitor C1 is connected between Vo and ground. A load 104 is connected in parallel with C1. A controller 102 is employed to generate a gate drive signal applied to the gate of Q1.

In accordance with an embodiment, the switch of FIG. 1 may be MOSFET devices. Alternatively, the switching element can be any controllable switches such as insulated gate bipolar transistor (IGBT) devices, integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices, silicon carbide (SiC) based power devices and the like.

It should be noted while FIG. 1 shows the switch is implemented as a single n-type transistor, a person skilled in the art would recognize there may be many variations, modifications and alternatives. For example, depending on different applications and design needs, the switch may be implemented as a p-type transistor. Furthermore, the switch shown in FIG. 1 may be implemented as a plurality of switches connected in parallel. Moreover, a capacitor may be connected in parallel with the switch to achieve zero voltage switching (ZVS)/zero current switching (ZCS).

In some embodiments, the controller 102 is configured such that the boost converter operates in a discontinuous conduction mode. In the discontinuous conduction mode, the boost converter functions as a power factor correction apparatus. In particular, the current drawn from the ac power supply by the boost converter is substantially in phase with the ac voltage provided by the ac power supply. As such, the boost converter can achieve a high power factor. In alternative embodiments, the controller 102 is configured such that the boost converter operates in a discontinuous conduction mode resembling a critical conduction mode when an input voltage of the boost converter reaches a peak value.

Furthermore, the controller 102 is able to select a suitable idle time or dead time so that the boost converter operates in the discontinuous conduction mode with a constant switching frequency over the line cycle as VIN varies from zero to its peak value.

In the discontinuous conduction mode, the current (Iind shown in FIG. 1) flowing through the inductor L1 includes three portions in one switching cycle. In a first portion (t1 shown in FIG. 1), the switch Q1 is turned on. The inductor current flows in a conductive path including the inductor L1 and the switch Q1. The current flowing through the inductor increases from zero to its peak value in a linear manner. Throughout the description, t1 may be alternatively referred to as a turn-on time of the boost converter.

In a second portion (t2 shown in FIG. 1), the switch Q1 is turned off. The inductor current flows in a conductive path including the inductor L1 and the diode D1. The current flowing through the inductor decrease from its peak value to zero in a linear manner. Throughout the description, t2 may be alternatively referred to as a turn-off time of the boost converter.

In a third portion (t3 shown in FIG. 1), the switch Q1 is turned off. The current stays at zero. Throughout the description, t3 may be alternatively referred to as an idle time or a dead time of the boost converter.

In some embodiments, the average input current of the boost converter can be expresses by the following equation:

$$I_{IN} = VIN \frac{t1 \times (t1 + t2)}{2 \times L \times T} \quad (1)$$

In Equation (1), $I_{IN}$ is the average input current of the boost converter. VIN is the input voltage of the boost converter. L is the inductance of L1. T is a switching time period of the boost converter.

In operation, $I_{IN}$ is proportional to VIN so as to achieve a high power factor. According to Equation (1), the controller 102 has to make t1×(t1+t2)/T constant so that $I_{IN}$ is proportional to VIN. As shown in FIG. 1, T can be expresses by the following equation:

$$T = t1 + t2 + t3 \quad (2)$$

In some embodiments, the controller 102 sets the following relationship:

$$t3 = A \times (t1 + t2) \quad (3)$$

In Equation (3), A is a predetermined constant.

In consideration with Equation (3), Equation (1) can be expresses by the following equation:

$$I_{IN} = VIN \frac{t1}{2 \times L \times (1 + A)} \quad (4)$$

In some embodiments, t1 is determined by the feedback loop of the boost converter. More particularly, t1 is determined by comparing a ramp signal with an output signal of an error amplifier. The feedback loop of the boost converter keeps t1 constant in one line cycle for achieving low distortion in the power factor correction operation.

In some embodiments, t1 is the amount of time the ramp takes to reach the output voltage of the error amplifier. In some embodiments, t1 can be considered as an initial turn-on time of the boost converter. The controller 102 is able to modify the initial turn-on time to pursue better performance. For convenience, in the following equations, the initial turn-on time is referred to as t10. The turn-on time is referred to as t1. The initial turn-on time can be expresses by the following equation:

$$t10 = \frac{V_{EA}}{S_R} \quad (5)$$

In Equation (5), $S_R$ is the ramp slope of the ramp signal. $V_{EA}$ is the output voltage of the error amplifier.

The controller 102 modifies the initial turn-on time using the following equation:

$$t1 = (1 + A) \times t10 \quad (6)$$

In consideration with Equation (6), Equation (4) can be expresses by the following equation:

$$I_{IN} = VIN \frac{t10}{2 \times L} \quad (7)$$

Equation (7) indicates $I_{IN}$ does not depend on A. Furthermore, $I_{IN}$ is proportional to VIN as long as t10 is maintained constant by the low bandwidth of the feedback loop of the boost converter. Since $I_{IN}$ is proportional to VIN, the boost converter can achieve a high power factor.

In consideration with Equation (6), Equation (2) can be expresses by the following equation:

$$T = (1 + A) \times (t1 + t2) \quad (8)$$

In consideration with the volt-second balance of the inductor L1, t1 and t2 satisfy the following equation:

$$t1 + t2 = t1 + t1 \frac{VIN}{Vo - VIn} \quad (9)$$

In Equation (9), Vo is the output voltage of the boost converter. Equation (9) can be simplified as the following equation:

$$t1 + t2 = t1 \frac{Vo}{Vo - VIN} \quad (10)$$

In consideration with Equation (6), Equation (10) can be expresses by the following equation:

$$t1 + t2 = (1 + A) \times t10 \frac{Vo}{Vo - VIN} \quad (11)$$

Equation (8) can be further simplified through substituting (t1+t2) in Equation (8) with that in Equation (11). Equation (8) can be expresses by the following equation:

$$T = (1 + A)^2 \times t10 \frac{Vo}{Vo - VIN} \quad (12)$$

Equation (7) above shows the variation of A does not have an impact on $I_{IN}$. Equation (12) indicates A can be used to adjust the switching frequency of the boost converter.

Equation (12) further indicates when VIN is approximately equal to zero (e.g., during a crossover of VIN), the controller 102 has to select a large value of A to keep T constant. Referring back to Equation (6), a large value of A means a large t1 at the crossover of VIN. One advantageous feature of having the large t1 at the crossover of VIN is the large t1 helps minimize the crossover distortion of the boost converter.

Equation (12) further indicates the controller 102 is able to adaptively reach a suitable T such that A can be changed to configure the boost converter to operate in a discontinuous conduction mode resembling a critical conduction mode. In particular, at the peak value of VIN, A is set to be approximately equal to zero. According to Equation (3), t3 is approximately equal to zero. Since t3 is very small, the discontinuous conduction mode with this small t3 is very close to the critical conduction mode. In other words, such a configuration makes the operation of the boost converter resemble the critical conduction mode when VIN is close to its peak value. This helps make the inductor peak currents almost match the peak currents at $V_{INPEAK}$ in the critical conduction mode, thus preventing a larger current caused by the discontinuous conduction mode.

In some embodiments, the controller 102 comprises a duty cycle generator, a turn-on time generator, an idle time generator, a frequency control circuit, an adaptive frequency reference generator and other suitable functional units.

Referring back to Equation (5) above, an initial turn-on time of the boost converter is determined by the output signal of the error amplifier and the ramp signal. The duty cycle generator is configured to generate the initial turn-on time of the boost converter based on a comparison between the output signal of the error amplifier and the ramp signal. The duty cycle generator is well known in the art, and hence is not discussed in detail herein.

Referring back to Equation (6) above, the turn-on time of the boost converter is obtained through modifying the initial turn-on time. In the controller 102, the turn-on time generator is configured to generate the turn-on time of the boost converter through multiplying the initial turn-on time by a predetermined constant greater than or equal to 1. The structure and operating principle of the turn-on time generator will be discussed in detail with respect to FIGS. 2-3.

The idle time generator is configured to generate an idle time (t3 shown in FIG. 1) of the boost converter. The structure and operating principle of the idle time generator will be discussed in detail with respect to FIG. 4.

The frequency control circuit configured to generate a variable for adjusting a value of the predetermined constant. The structure and operating principle of the frequency control circuit will be discussed in detail with respect to FIG. 5.

The adaptive frequency reference generator is configured to generate a frequency reference that is adaptable to the peak line voltage. The frequency reference is fed into the frequency control circuit. The structure and operating principle of the adaptive frequency reference generator will be discussed in detail with respect to FIG. 6.

One advantageous feature of having the controller 102 is the control scheme described above help to reduce the size of the input line filter. In a conventional boost converter operating in the critical conduction mode, the switch frequency may vary in a wide range. The line filter has to be larger to filter out the lower frequency harmonics occurred in the wide frequency range. In the present disclosure, the controller 102 is able to maintain the switching frequency constant during one line cycle. The constant switching frequency helps to reduce the size of the input line filter.

Figure 2:
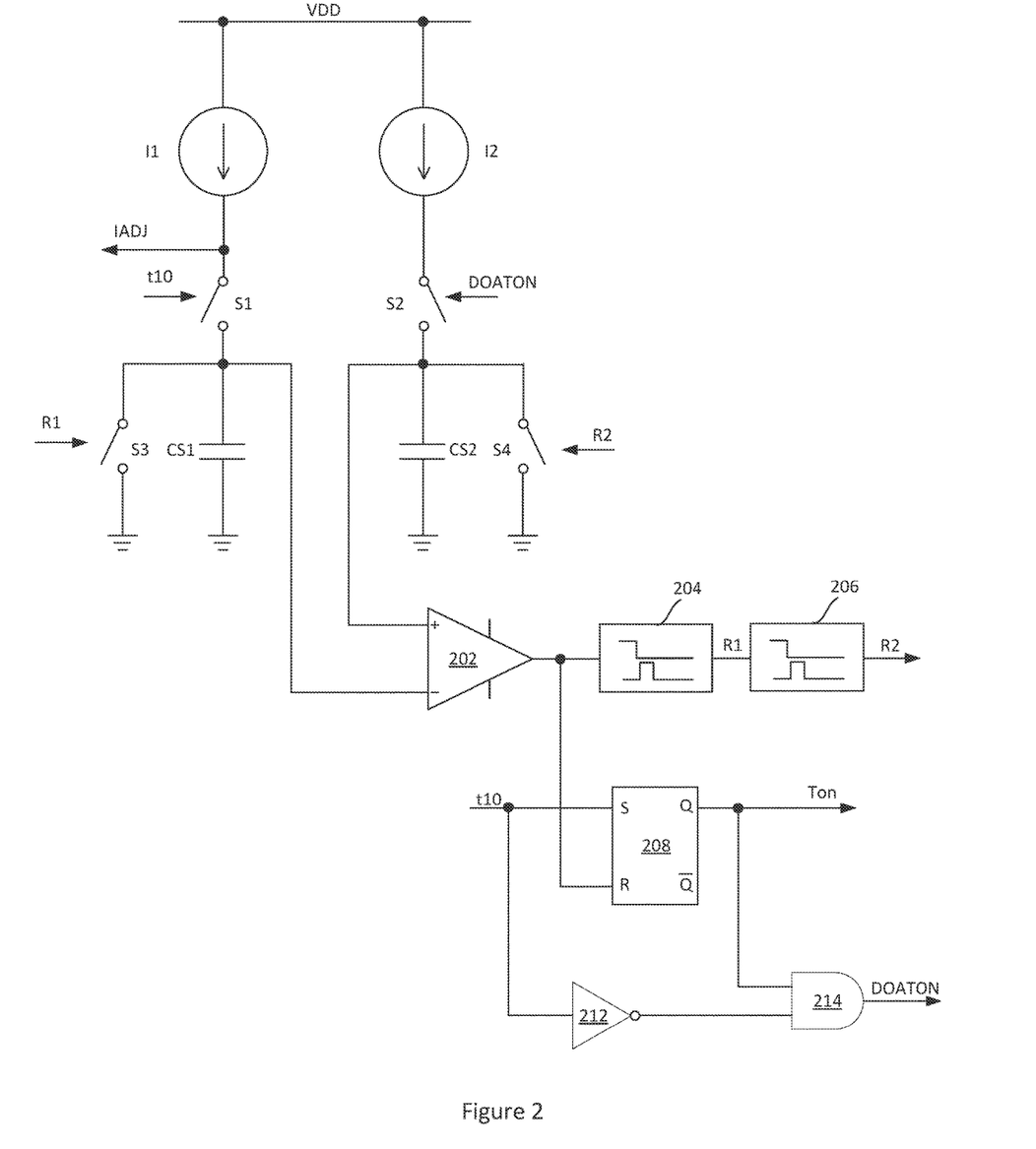
FIG. 2 illustrates a schematic diagram of the turn-on time generator in accordance with various embodiments of the present disclosure.

FIG. 2 illustrates a schematic diagram of the turn-on time generator in accordance with various embodiments of the present disclosure. The turn-on time generator comprises current sources I1, I2, switches S1, S2, S3, S4, capacitors CS1, CS2, a comparator 202, one-shot circuits 204, 206, a latch circuit 208, an inverter 212 and an AND gate 214.

As shown in FIG. 2, a first current source I1, a first switch S1 and a first capacitor CS1 are connected in series between a bias voltage bus VDD and ground. A gate of the first switch is configured to receive a signal representative of the initial turn-on time t10 of the boost converter. In some embodiments, t10 is determined by the feedback loop of the boost converter. In particular, t10 is determined by comparing a ramp signal with an output signal of an error amplifier.

A second current source I2, a second switch S2 and a second capacitor CS2 are connected in series between the bias voltage bus VDD and ground. A gate of the second switch S2 is configured to receive a signal (DOATON) representative of a result of performing an AND operation on the turn-on time Ton and an inverse signal of the initial turn-on time t10. It should be noted Ton in FIG. 2 corresponds to t1 in Equation (6).

A third switch S3 is connected in parallel with the first capacitor CS1. A fourth switch S4 is connected in parallel with the second capacitor CS2. An inverting input of the comparator 202 is connected to a common node of the first switch S1 and the first capacitor CS1. A non-inverting input of the comparator 202 is connected to a common node of the second switch S2 and the second capacitor CS2.

A first one-shot circuit 204 has an input connected to the output of the comparator 202, and an output connected to a gate of the third switch S3. The first one-shot circuit 204 is configured to generate a pulse. In particular, when the first one-shot circuit 204 is triggered, a pulse of pre-defined duration is produced. The first one-shot circuit 204 then returns to its stable state and produces no more output until it is triggered again. The operating principle of the first one-shot circuit 204 will be discussed below with respect to FIG. 3.

A second one-shot circuit 206 has an input connected to the output of the first one-shot circuit 204, and an output connected to a gate of the fourth switch S4. The operating principle of the second one-shot circuit 206 is similar to that of the first one-shot circuit 204, and hence is not discussed in further detail herein.

A set input of the latch circuit 208 is configured to receive the signal representative of the initial turn-on time of the boost converter. A reset input of the latch circuit 208 is connected to the output of the comparator 202.

A first input of the AND gate 214 is connected to the Q output of the latch circuit 208. A second input of the AND gate 214 is configured to receive the initial turn-on time of the boost converter through the inverter 212. An output of the AND gate 214 is configured to generate the DOATON signal.

In operation, the turn-on time generator shown in FIG. 2 is configured to generate the turn-on time t1 based on the initial turn-on time t10. Referring back to Equation (6), A is set by selecting values of the current sources I1 and I2. An adjustable current IADJ is drawn from a common node of I1 and S1. IADJ is a current that is generated by the frequency control circuit discussed below with respect to FIG. 5. IADJ is employed to modulate A during the cycle so as to main the switching frequency of the boost converter constant. Referring back to Equation (12), in one line cycle, VIN varies from zero to its peak value. In response to the variation of VIN, A has to be adjusted so as to keep T constant, thereby maintaining the switching frequency of the boost converter constant. A can be expressed by the following equation:

$$A=(I1-IADJ)/I2 \qquad (13)$$

Ton generated by the latch circuit 208 corresponds to t1 in Equation (6). According to FIG. 2, t1 can be expressed by the following equation:

$$t1 = \left(1 + \frac{I1-IADJ}{I2}\right) \times t10 \qquad (14)$$

Figure 3:
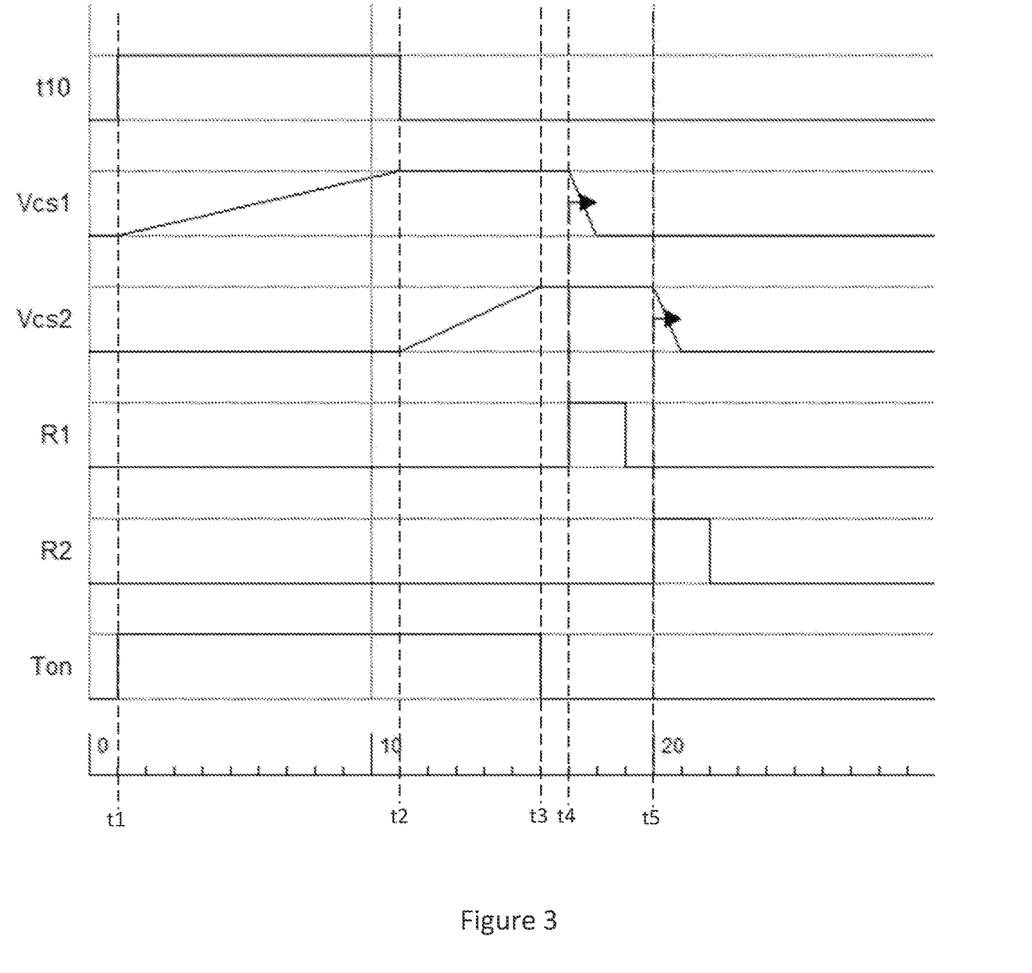
FIG. 3 illustrates a variety of signals associated with the turn-on time generator shown in FIG. 2 in accordance with various embodiments of the present disclosure.

FIG. 3 illustrates a variety of signals associated with the turn-on time generator shown in FIG. 2 in accordance with various embodiments of the present disclosure. The horizontal axis of FIG. 3 represents intervals of time. There may be six rows in FIG. 3. The first row represents the initial turn-on time t10 of the boost converter. The second row represents the voltage Vcs1 across the first capacitor CS1 shown in FIG. 2. The third row represents the voltage Vcs2 across the second capacitor CS2 shown in FIG. 2. The fourth row represents the output signal R1 of the first one-shot circuit 204 shown in FIG. 2. The fifth row represents the output signal R2 of the second one-shot circuit 206 shown in FIG. 2. The six row represents the turn-on time Ton of the boost converter.

At t0, both t10 and Ton change from a logic low state to a logic high state. S1 is controlled by t10. In response to the change of t0, S1 is turned on. I1 starts to charge CS1. As shown in FIG. 3, from t1 to t2, Vcs1 increases in a linear manner. At t2, t10 changes from a logic high state to a logic low state. I1 stops charging CS1. Vcs1 stays the same from t2 to t4.

From t2 to t3, by performing an AND operation on the turn-on time Ton and an inverse signal of the initial turn-on time t1, DOATON is of a logic high state. S4 is turned on. I2 starts to charge CS2 from t2. As shown in FIG. 3, from t2 to t3, Vcs2 increases in a linear manner. At t3, once the voltage across Vcs2 reaches the voltage on Vcs1, the comparator 202 generates a logic high signal. This logic high signal is applied to the reset input of the latch 208. In response to this logic high signal, the Q output (Ton) of the latch 208 changes from a logic high state to a logic low state. In response to this change, S2 is turned off. I2 stops charging CS2. Vcs2 stays the same from t3 to t5.

At t4, the first one-shot circuit 204 is triggered. The output signal R1 of the first one-shot circuit 204 has a pulse. This pulse resets the voltage across CS1. As shown in FIG. 3, after t4, Vcs1 drops to zero in a linear manner. Likewise, at t5, the second one-shot circuit 206 is triggered. The output signal R2 of the second one-shot circuit 206 has a pulse. This pulse resets the voltage across CS2. As shown in FIG. 3, after t5, Vcs2 drops to zero in a linear manner.

Figure 4:
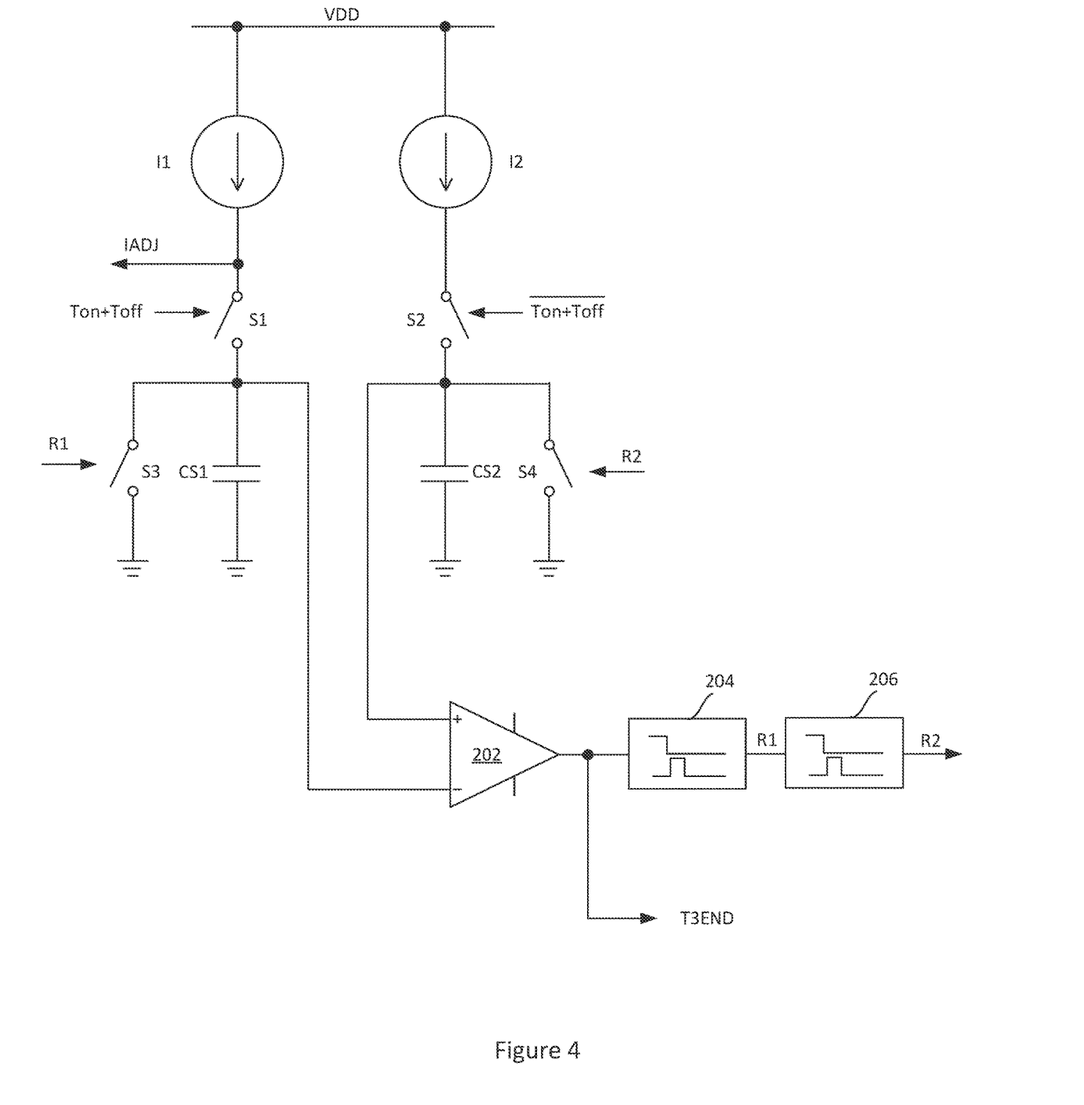
FIG. 4 illustrates a schematic diagram of the idle time generator in accordance with various embodiments of the present disclosure.

FIG. 4 illustrates a schematic diagram of the idle time generator in accordance with various embodiments of the present disclosure. The idle time generator comprises current sources I1, I2, switches S1, S2, S3, S4, capacitors CS1, CS2, a comparator 202 and one-shot circuits 204, 206.

As shown in FIG. 4, a first current source I1, a first switch S1 and a first capacitor CS1 are connected in series between a bias voltage bus VDD and ground. A gate of the first switch S1 is configured to receive a signal representative of a sum the turn-on time Ton (t1 shown in FIG. 1) and a turn-off time Toff (t2 shown in FIG. 1) of the boost converter.

A second current source I2, a second switch S2 and a second capacitor CS2 are connected in series between the bias voltage bus VDD and ground. A gate of the second switch S2 is configured to receive an inverse signal of the signal representative of the sum the turn-on time and a turn-off time of the boost converter.

A third switch S3 is connected in parallel with the first capacitor CS1. A fourth switch S4 is connected in parallel with the second capacitor CS2.

An inverting input of the comparator 202 is connected to a common node of the first switch S1 and the first capacitor CS1. A non-inverting input of the comparator 202 is connected to a common node of the second switch S2 and the second capacitor CS2. An output of the comparator 202 is configured to generate T3END, which is used to determine the idle time t3 of the boost converter.

A first one-shot circuit 204 has an input connected to the output of the comparator 202, and an output connected to a gate of the third switch S3. A second one-shot circuit 206 has an input connected to the output of the first one-shot circuit 204, and an output connected to a gate of the fourth switch S4.

An adjustable current IADJ is drawn from a common node of I1 and S1. IADJ is a current that is generated by the frequency control circuit discussed below with respect to FIG. 5.

In operation, Ton (t1) is generated by the method described above with respect to FIG. 3, and Toff (t2) is generated based on the standard technique well known in the art. Once t1 and t2 are available, the idle time generator shown in FIG. 4 is configured to generate T3END. Similar to the operation principle of the circuit in FIG. 3, S1 is turned on and the current source (I1−IADJ) starts to charge CS1. At Ton+Toff, S1 is turned off and CS1 holds the charge Q1 proportional to (I1−IADJ)×(t1+t2). At this point, S2 is turned on and I2 starts to charge CS2. In the duration of Q1/I2, the voltage on CS2 reaches a voltage level equal to the voltage on CS1. Once the voltage on CS2 reaches the voltage on CS1, the comparator 202 generates a logic high signal at T3END. T3END is employed to signal the end of t3 when T3END goes high. In some embodiments, $t_3$ can be expressed by the following equation:

$$t3 = \left(1 + \frac{I1 - IADJ}{I2}\right) \times (t1 + t2) \quad (15)$$

Figure 5:
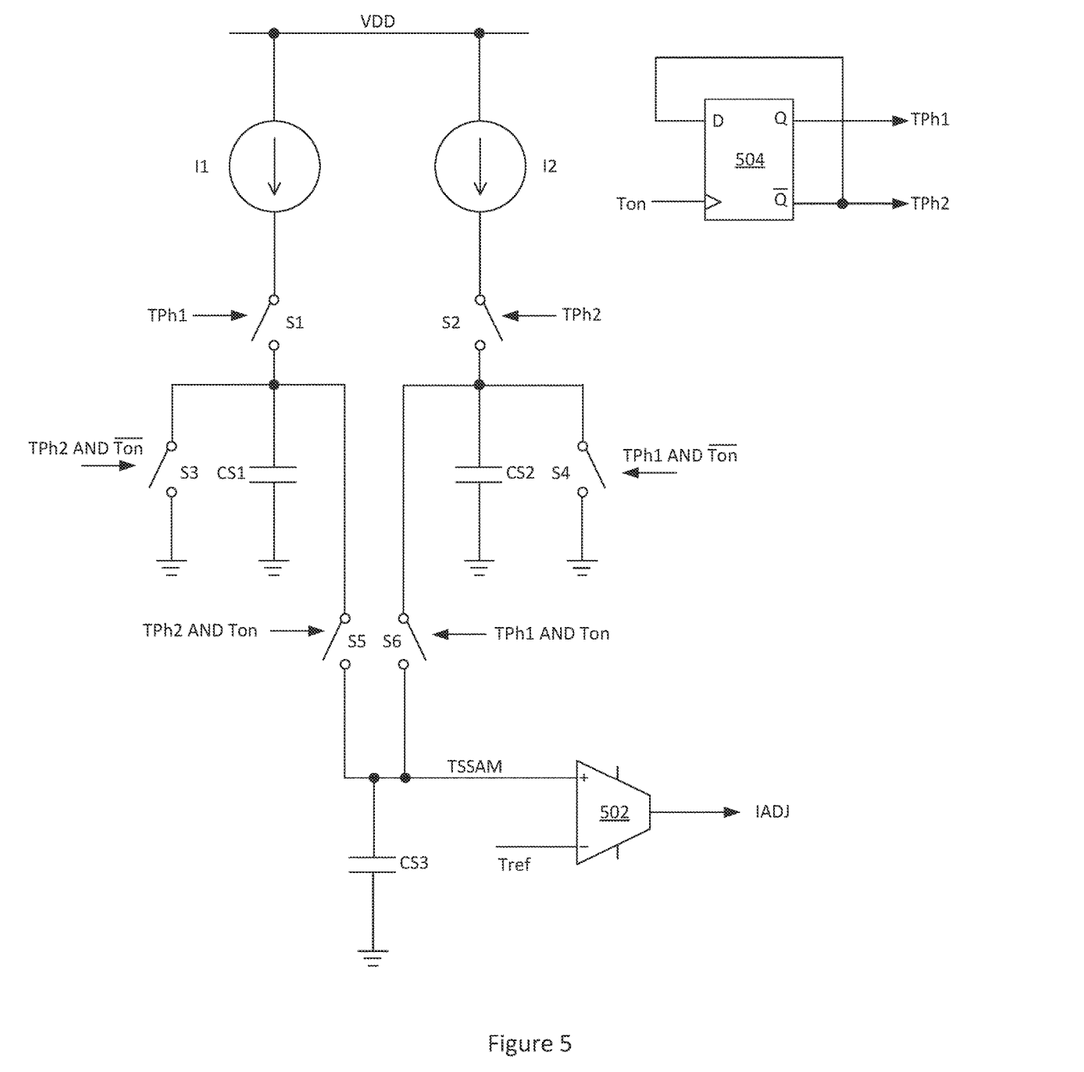
FIG. 5 a schematic diagram of the frequency control circuit in accordance with various embodiments of the present disclosure.

FIG. 5 illustrates a schematic diagram of the frequency control circuit in accordance with various embodiments of the present disclosure. The frequency control circuit comprises current sources I1, I2, switches S1, S2, S3, S4, S5, S6, capacitors CS1, CS2, CS3, a transconductance amplifier 502 and a latch circuit 504.

As shown in FIG. 5, a data input and a Q-bar output of the latch circuit 504 are connected together. A clock input of the latch circuit 504 is configured to receive a signal representative of the turn-on time (Ton) of the boost converter. A Q output of the latch circuit 504 is configured to generate a first phase signal TPh1. The Q-bar output of the latch circuit 504 is configured to generate a second phase signal TPh2.

As shown in FIG. 5, a first current source I1, a first switch S1 and a first capacitor CS1 are connected in series between a bias voltage bus VDD and ground. A gate of the first switch S1 is configured to receive the first phase signal TPh1.

A second current source I2, a second switch S2 and a second capacitor CS2 are connected in series between the bias voltage bus VDD and ground. A gate of the second switch S2 is configured to receive the second phase signal TPh2.

A third switch S3 is connected in parallel with the first capacitor CS1. A gate of the third switch S3 is configured to receive a signal representative of a result of performing an AND operation on the second phase signal TPh2 and an inverse signal of the turn-on time Ton of the boost converter.

A fourth switch S4 is connected in parallel with the second capacitor CS2. A gate of the fourth switch S4 is configured to receive a signal representative of a result of performing an AND operation on the first phase signal TPh1 and the inverse signal of the turn-on time Ton of the boost converter.

A non-inverting input of the transconductance amplifier 502 is configured to receive a signal representative of a sampled time TSSAM of the switching time period. An inverting input of the transconductance amplifier 502 is configured to receive an adaptive frequency reference Tref. The adaptive frequency reference Tref is generated by the adaptive frequency reference generator to be discussed below with respect to FIG. 6. An output of the transconductance amplifier 502 is configured to generate the variable IADJ for adjusting the value of the predetermined constant A. Referring back to Equation (13), IADJ can be used to adjust the value A. By adjusting A, the switching frequency of the boost converter can be maintained constant in one line cycle of VIN.

A fifth switch S5 is connected between a common node of the first switch S1 and the first capacitor CS1, and the non-inverting input of the transconductance amplifier 502. A gate of the fifth switch S5 is configured to receive a signal representative of a result of performing an AND operation on the second phase signal TPh2 and the turn-on time Ton of the boost converter.

A sixth switch S6 is connected between a common node of the second switch S2 and the second capacitor CS2, and the non-inverting input of the transconductance amplifier 502. A gate of the sixth switch S6 is configured to receive a signal representative of a result of performing an AND operation on the first phase signal TPh1 and the turn-on time ton of the boost converter. A third capacitor CS3 is connected between the non-inverting input of the transconductance amplifier 502 and ground.

In operation, TPh1 and TPh2 are two alternate phase signals that are high for one switching period alternatively so that the controller 102 is able to get continuous sampling of the time period on CS3. In some embodiments, the capacitance of CS1 is equal to the capacitance of CS2. The ratio of CS3 to CS1/CS2 controls the stability of the frequency control circuit.

It should be noted that the stability of the frequency control circuit can be analyzed using z transform techniques to obtain the loop gain of the frequency control method. The z transform techniques are well known in the art, hence are not discussed in detail herein.

Tref is a reference for determining the switching time period of the boost converter. If the sampled time period TSSAM of the boost converter is greater than Tref, then IADJ is of a positive value. Referring back to Equation (13), the positive value of IADJ makes A lower. Referring back to Equations (6) and (3), the reduced A makes t1 and t3 lower, thereby reducing the switching time period of the boost converter. This control mechanism forms a negative feedback loop.

In some embodiment, Tref can be set constant to keep the switching frequency of the boost converter constant. The switching frequency may be set at the slowest frequency of the system for different line voltages and load settings.

In alternative embodiments, Tref can be adaptively generated so as to minimize t3 when VIN is at its peak so as to get the minimum inductor peak currents. This configuration makes the operation of the boost converter resemble the operation of the critical conduction mode when VIN is at its peak within one line cycle.

One advantageous feature of adjusting Tref is that the boost converter is able to achieve a stable frequency over the peak line voltage change. Furthermore, adjusting Tref based on the peak line voltage also improves the total harmonic distortion (THD) of the power factor correction system. It should be noted that Tref stays steady when the input voltage is fixed (e.g., 110 V). When the input voltage changes in a wide range (e.g., from 85 V to 135 V), Tref needs to be adjusted such that at the peak line voltage within one line cycle, the switching frequency stays the same with a minimum dead time. Furthermore, when the input voltage changes in a wide range, the adjustment of Tref helps to make the operation of the boost converter resemble the operation of the critical conduction mode at different VIN voltages when the line voltage reaches its peak within one line cycle. For example, when VIN is equal to 110 V, Tref is set to a first predetermined value. Under the first predetermined value, the switching frequency of the boost converter is maintained substantially constant within one line cycle. In addition, the operation of the boost converter resembles the operation of the critical conduction mode when VIN is at its peak value within one line cycle. On the other hand, when VIN drops to a low input voltage such as 85 V, Tref is set to a second predetermined value for making the operation of the boost converter resemble the operation of the critical conduction mode when the line voltage reaches its peak within one line cycle under the low input voltage. Under the second predetermined value, the switching frequency of the boost converter is maintained substantially constant within one line cycle. In addition, the operation of the boost converter resembles the operation of the critical conduction mode when VIN is at its peak value within one line cycle.

Figure 6:
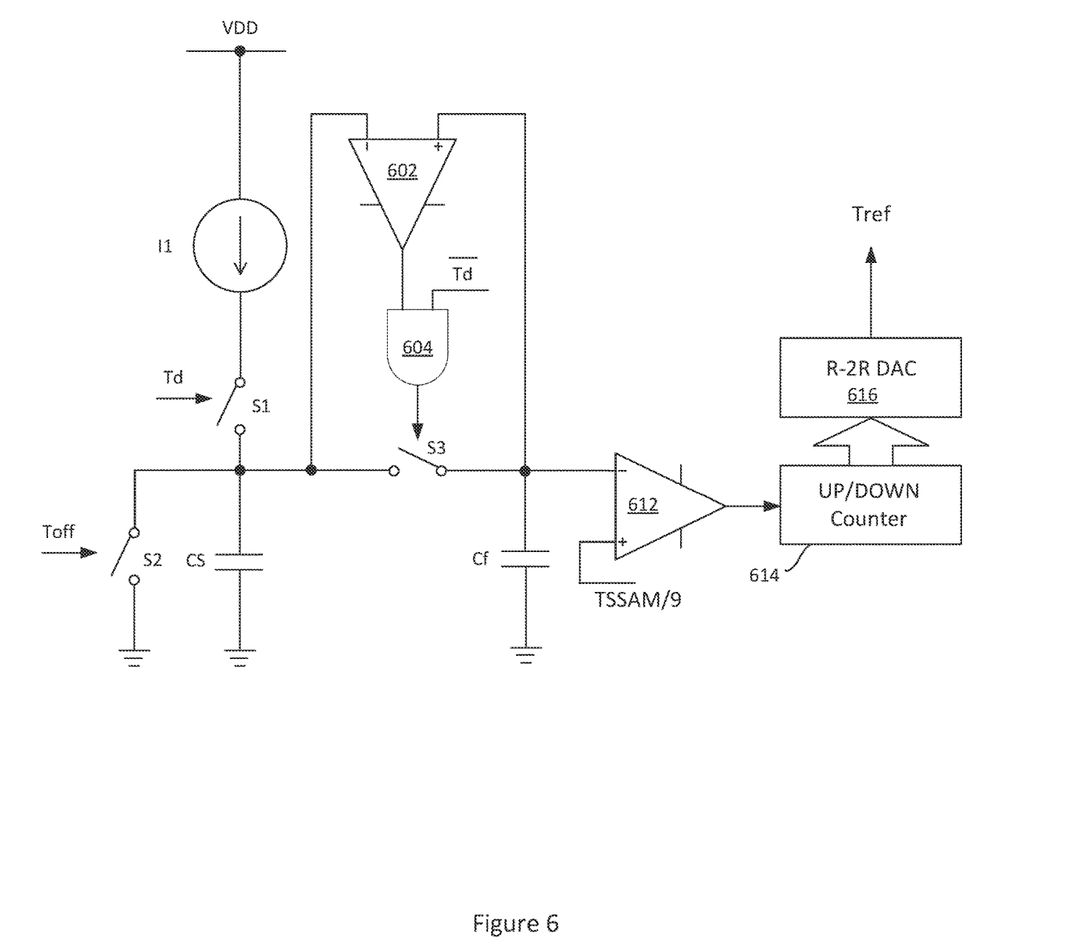
FIG. 6 illustrates a schematic diagram of the adaptive frequency reference generator in accordance with various embodiments of the present disclosure.

FIG. 6 illustrates a schematic diagram of the adaptive frequency reference generator in accordance with various embodiments of the present disclosure. The adaptive frequency reference generator comprises a first sample circuit, a second sample circuit, a switch S3, a minimum peak detection circuit, a comparator 612 and a negative feedback circuit.

The first sample circuit comprises a current source I1, a first switch S1, a first capacitor CS and a second switch S2. As shown in FIG. 6, the current source I1, the first switch S1 and the first capacitor CS are connected in series between VDD and ground. The second switch S2 is connected in parallel with CS. A gate of the first switch S1 is configured to receive a signal Td. In some embodiments, Td is equal to t3. A gate of the second switch S2 is configured to receive a signal Toff. In some embodiments, Toff is equal to t2. In operation, the first sample circuit is configured to store a first signal representative of an idle time t3 of the boost converter.

The second sample circuit comprises Cf. The second sample circuit is configured to store a second signal representative of a minimum idle time t3 when a peak value of the input voltage VIN is applied to the boost converter.

The switch S3 is connected between the first sample circuit and the second sample circuit. The minimum peak detection circuit comprises a comparator 602 and an AND gate 604. As shown in FIG. 6, an inverting input of the comparator 602 is connected to a common node of S1 and CS. A non-inverting input of the comparator 602 is connected to a common node of S3 and Cf. A first input of the AND gate 604 is connected to the output of the comparator 602. A second input of the AND gate 604 is configured to receive an inverse signal of Td. The output of the AND gate 604 is configured to generate a control signal for the switch S3.

An inverting input of the comparator 612 is connected to the common node of S3 and Cf. A non-inverting input of the comparator 612 is configured to receive a signal equal to TSSAM divided by a predetermined number. In some embodiments, the predetermined number is equal to 9. The factor 9 shown in FIG. 6 indicates that once the switching frequency settles down, the idle time (t3) at the peak of the input voltage is approximately equal to ⅑ of the switching time period of the boost converter. It should be noted the number (9) shown in FIG. 6 is merely an example. Depending on different applications and design needs, this number may vary accordingly.

The comparator 612 is configured to compare the minimum idle time (the voltage across Cf) with the sampled time TSSAM divided by the predetermined number. The negative feedback circuit comprises an up/down counter 614 and an R-2R digital-to-analog converter (DAC) 616. The negative feedback circuit is configured to reduce the minimum idle time based on a comparison result generated by the comparator.

In operation, if the idle time t3 is more that a predetermined time (e.g., ⅑ of the sampled switching time period TSSAM), then in every cycle, the up/down counter 614 counts down and decreases Tref accordingly. The reduced Tref makes the idle time t3 shorter. As such, the control circuit shown in FIG. 6 completes the negative feedback control of t3.

It should be noted that the timing generation circuit (e.g., the turn-on time generator in FIG. 2 and the idle time generator in FIG. 4) can be implemented in different ways. For example, the functions shown in FIGS. 2 and 4 can be obtained through digital circuits with the timings measured and generated digitally using high speed clocks, counters and/or a microprocessor. The adaptive frequency generation scheme can implement a different loop function which may be completely analog as compared to the one shown in FIG. 6 where the reference Tref is generated digitally using a up/down counter and a DAC.

Figure 7:
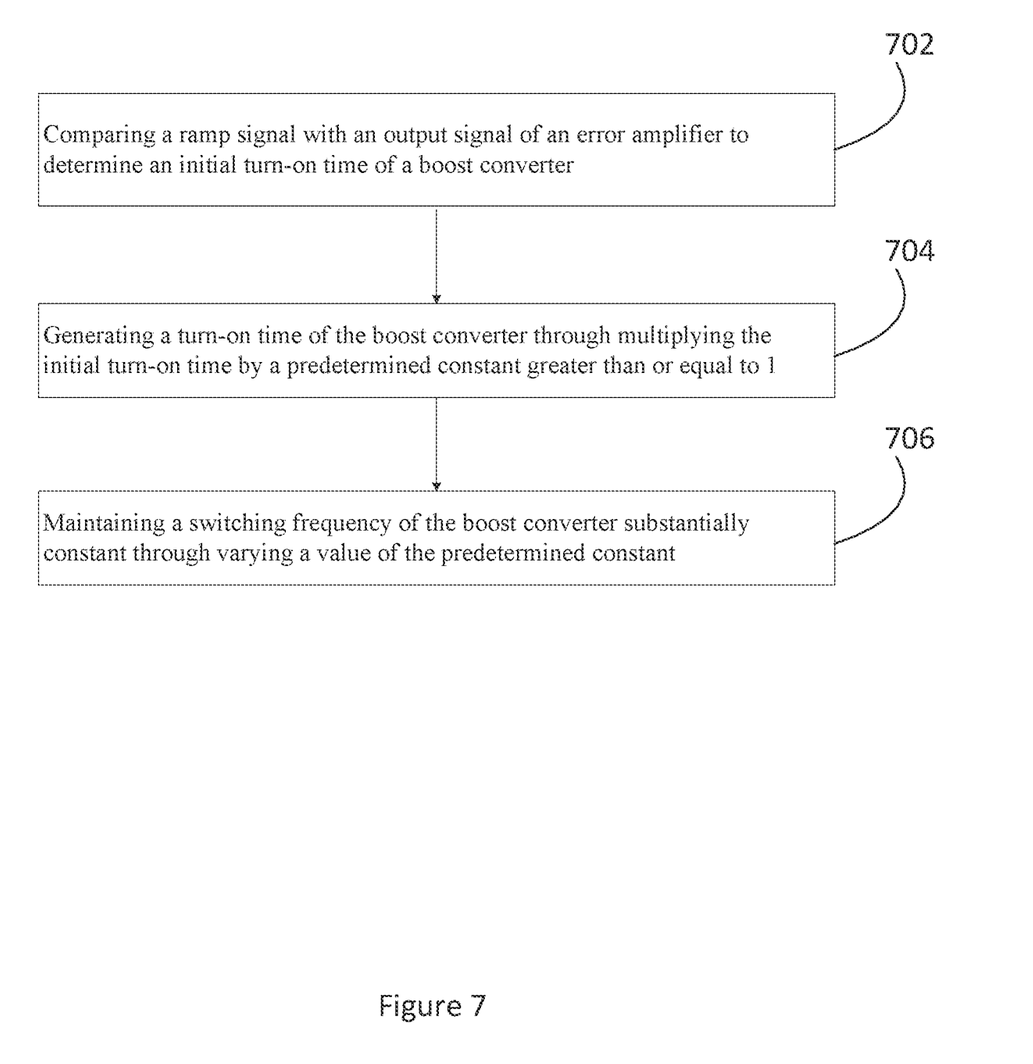
FIG. 7 illustrates a flow chart of a control method for the boost converter shown in FIG. 1 in accordance with various embodiments of the present disclosure.

FIG. 7 illustrates a flow chart of a control method for the boost converter shown in FIG. 1 in accordance with various embodiments of the present disclosure. This flowchart shown in FIG. 7 is merely an example, which should not unduly limit the scope of the claims. One of ordinary skill in the art would recognize many variations, alternatives, and modifications. For example, various steps illustrated in FIG. 7 may be added, removed, replaced, rearranged and repeated.

A power conversion system is coupled between an ac power supply and a load. The power conversion system includes a rectifier having inputs connected to the ac power supply and a boost converter having inputs connected to outputs of the rectifier. The boost converter is configured as a power factor correction boost converter.

Referring back to FIG. 1, the boost converter comprises an inductor and a switch connected in series between an input port and ground, and a freewheeling device connected between a common node of the inductor and the switch, and an output port. In some embodiments, the freewheeling device is a diode. The power conversion system further comprises a controller configured to generate a gate drive signal fed into a gate of the switch.

At step 702, a ramp signal is compared with an output signal of an error amplifier. The comparison result is used to determine an initial turn-on time of a boost converter.

At step 704, a turn-on time of the boost converter is generated through multiplying the initial turn-on time by a predetermined constant greater than or equal to 1. Referring back to Equation (6), the turn-on time is t1. The initial turn-on time is t10. The predetermined constant is (1+A).

At step 706, a switching frequency of the boost converter can be maintained substantially constant through varying a value of the predetermined constant.

As a result of generating the turn-on time of the boost converter through multiplying the initial turn-on time by the predetermined constant greater than 1, an average input current of the boost converter is proportional to an input voltage of the boost converter.

The method further comprises at a crossover point of an input voltage of the boost converter, increasing the value of the predetermined constant to maintain the switching frequency substantially constant. As a result of increasing the value of the predetermined constant to maintain the switching frequency substantially constant, the turn-on time of the boost converter increases to minimize crossover distortion.

The method further comprises adjusting a frequency reference in response to a peak line voltage change, wherein as a result of adjusting the frequency reference in response to the peak line voltage change, under different peak line voltages, the boost converter operates in a mode resembling a critical conduction mode at a peak voltage within one line cycle.

The method further comprises configuring the boost converter to operate in a discontinuous conduction mode with a minimized idle time when an input voltage of the boost converter reaches a peak value, wherein as a result of having the minimized idle time, the boost converter operates in a mode resembling a critical conduction mode at a peak voltage of a line cycle, while maintaining the switching frequency substantially constant within the line cycle. The predetermined constant is equal to 1 when the input voltage of the boost converter reaches the peak value within the line cycle.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method comprising:
   comparing a ramp signal with an output signal of an error amplifier to determine an initial turn-on time of a boost converter;
   generating a turn-on time of the boost converter through multiplying the initial turn-on time by a predetermined constant greater than or equal to 1; and
   maintaining a switching frequency of the boost converter substantially constant through varying a value of the predetermined constant.

2. The method of claim 1, wherein:
   as a result of generating the turn-on time of the boost converter through multiplying the initial turn-on time by the predetermined constant greater than 1, an average input current of the boost converter is proportional to an input voltage of the boost converter.

3. The method of claim 1, wherein:
   the boost converter is configured to operate in a discontinuous conduction mode.

4. The method of claim 1, further comprising:
   at a crossover point of an input voltage of the boost converter, increasing the value of the predetermined constant to maintain the switching frequency substantially constant, wherein as a result of increasing the value of the predetermined constant to maintain the switching frequency substantially constant, the turn-on time of the boost converter increases to minimize crossover distortion.

5. The method of claim 1, further comprising:
   adjusting a frequency reference in response to a peak line voltage change, wherein as a result of adjusting the frequency reference in response to the peak line voltage change, under different peak line voltages, the boost converter operates in a mode resembling a critical conduction mode at a peak voltage within one line cycle.

6. The method of claim 1, further comprising:
configuring the boost converter to operate in a discontinuous conduction mode with a minimized idle time when an input voltage of the boost converter reaches a peak value, wherein as a result of having the minimized idle time, the boost converter operates in a mode resembling a critical conduction mode at a peak voltage of a line cycle, while maintaining the switching frequency substantially constant within the line cycle.

7. The method of claim 6, wherein:
the predetermined constant is equal to 1 when the input voltage of the boost converter reaches the peak value within the line cycle.

8. A controller comprising:
a duty cycle generator configured to generate an initial turn-on time of a boost converter based on a comparison between an error amplifier output signal and a ramp; and
a turn-on time generator configured to generate a turn-on time of the boost converter through multiplying the initial turn-on time by a predetermined constant greater than or equal to 1.

9. The controller of claim 8, further comprising:
an idle time generator configured to generate an idle time of the boost converter.

10. The controller of claim 9, wherein the idle time generator comprises:
a first current source, a first switch and a first capacitor connected in series between a bias voltage bus and ground, and wherein a gate of the first switch is configured to receive a signal representative of a sum the turn-on time and a turn-off time of the boost converter;
a second current source, a second switch and a second capacitor connected in series between the bias voltage bus and ground, and wherein a gate of the second switch is configured to receive an inverse signal of the signal representative of the sum the turn-on time and the turn-off time of the boost converter;
a third switch connected in parallel with the first capacitor;
a fourth switch connected in parallel with the second capacitor;
a comparator having an inverting input connected to a common node of the first switch and the first capacitor, and a non-inverting input connected to a common node of the second switch and the second capacitor, and wherein an output of the comparator is configured to generate a signal for determining the idle time of the boost converter;
a first one-shot circuit having an input connected to the output of the comparator, and an output connected to a gate of the third switch; and
a second one-shot circuit having an input connected to the output of the first one-shot circuit, and an output connected to a gate of the fourth switch.

11. The controller of claim 8, further comprising:
a frequency control circuit configured to generate a variable for adjusting a value of the predetermined constant.

12. The controller of claim 11, wherein the frequency control circuit comprises:
a latch circuit having a data input and a Q-bar output connected together, a clock input configured to receive a signal representative of the turn-on time of the boost converter and a Q output, and wherein the Q output is configured to generate a first phase signal, and the Q-bar output is configured to generate a second phase signal;
a first current source, a first switch and a first capacitor connected in series between a bias voltage bus and ground, and wherein a gate of the first switch is configured to receive the first phase signal;
a second current source, a second switch and a second capacitor connected in series between the bias voltage bus and ground, and wherein a gate of the second switch is configured to receive the second phase signal;
a third switch connected in parallel with the first capacitor, and wherein a gate of the third switch is configured to receive a signal representative of a result of performing an AND operation on the second phase signal and an inverse signal of the turn-on time of the boost converter;
a fourth switch connected in parallel with the second capacitor, and wherein a gate of the fourth switch is configured to receive a signal representative of a result of performing an AND operation on the first phase signal and the inverse signal of the turn-on time of the boost converter;
a transconductance amplifier having a non-inverting input configured to receive a signal representative of a sampled time, and an inverting input configured to receive an adaptive frequency reference, and wherein an output of the transconductance amplifier is configured to generate the variable for adjusting the value of the predetermined constant;
a fifth switch connected between a common node of the first switch and the first capacitor, and the non-inverting input of the transconductance amplifier, and wherein a gate of the fifth switch is configured to receive a signal representative of a result of performing an AND operation on the second phase signal and the turn-on time of the boost converter;
a sixth switch connected between a common node of the second switch and the second capacitor, and the non-inverting input of the transconductance amplifier, and wherein a gate of the sixth switch is configured to receive a signal representative of a result of performing an AND operation on the first phase signal and the turn-on time of the boost converter; and
a third capacitor connected between the non-inverting input of the transconductance amplifier and ground.

13. The controller of claim 12, further comprising:
an adaptive frequency reference generator configured to generate the adaptive frequency reference fed into the inverting input of the transconductance amplifier.

14. The controller of claim 13, wherein the adaptive frequency reference generator comprises:
a first sample circuit configured to store a first signal representative of an idle time of the boost converter;
a second sample circuit configured to store a second signal representative of a minimum idle time when a peak value of an input voltage is applied to the boost converter;
a switch connected between the first sample circuit and the second sample circuit;
a minimum peak detection circuit configured to generate a control signal for the switch;
a comparator configured to compare the minimum idle time with the sampled time divided by a predetermined number; and a negative feedback circuit configured to reduce the minimum idle time based on a comparison result generated by the comparator.

15. The controller of claim 8, wherein the turn-on time generator comprises:
a first current source, a first switch and a first capacitor connected in series between a bias voltage bus and ground, and wherein a gate of the first switch is configured to receive a signal representative of the initial turn-on time of the boost converter;
a second current source, a second switch and a second capacitor connected in series between the bias voltage bus and ground, and wherein a gate of the second switch is configured to receive a signal representative of a result of performing an AND operation on the turn-on time and an inverse signal of the initial turn-on time;
a third switch connected in parallel with the first capacitor;
a fourth switch connected in parallel with the second capacitor;
a comparator having an inverting input connected to a common node of the first switch and the first capacitor, and a non-inverting input connected to a common node of the second switch and the second capacitor;
a first one-shot circuit having an input connected to the output of the comparator, and an output connected to a gate of the third switch;
a second one-shot circuit having an input connected to the output of the first one-shot circuit, and an output connected to a gate of the fourth switch;
a latch circuit having a set input configured to receive the signal representative of the initial turn-on time of the boost converter, a reset input connected to the output of the comparator and a Q output configured to generate the turn-on time of the boost converter; and
an AND gate having a first input connected to the Q output, a second input configured to receive the initial turn-on time of the boost converter through an inverter, and an output configured to generate the signal applied to the gate of the second switch.

16. A system comprising:
a boost converter comprising an inductor and a switch connected in series between an input port and ground and a freewheeling device connected between a common node of the inductor and the switch, and an output port; and
a controller configured to generate a gate drive signal fed into a gate of the switch, wherein the controller comprises:
a duty cycle generator configured to generate an initial turn-on time of the switch based on a comparison between an error amplifier output signal and a ramp; and
a turn-on time generator configured to generate an turn-on time of the switch through multiplying the initial turn-on time by a predetermined constant greater than or equal to 1.

17. The system of claim 16, wherein:
the freewheeling device is a diode having an anode connected to the common node of the inductor and the switch, and a cathode connected to the output port.

18. The system of claim 16, wherein the controller further comprises:
an idle time generator configured to generate an idle time of the boost converter when the boost converter is configured to operate in a discontinuous conduction mode.

19. The system of claim 16, wherein the controller further comprises:
a frequency control circuit configured to generate a variable for adjusting a value of the predetermined constant when the boost converter is configured to operate in a discontinuous conduction mode.

20. The system of claim 16, wherein:
the boost converter is configured to operate in a discontinuous conduction mode resembling a critical conduction mode when an input voltage of the boost converter reaches a peak value within a line cycle.

* * * * *